United States Patent
Kubo

(10) Patent No.: US 8,817,282 B2
(45) Date of Patent: Aug. 26, 2014

(54) IMAGE FORMING APPARATUS

(75) Inventor: Takashi Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 13/509,224

(22) PCT Filed: Oct. 29, 2010

(86) PCT No.: PCT/JP2010/069254
§ 371 (c)(1),
(2), (4) Date: May 10, 2012

(87) PCT Pub. No.: WO2011/058887
PCT Pub. Date: May 19, 2011

(65) Prior Publication Data
US 2012/0229837 A1 Sep. 13, 2012

(30) Foreign Application Priority Data
Nov. 11, 2009 (JP) ................. 2009-258373

(51) Int. Cl.
*G06F 15/00* (2006.01)
(52) U.S. Cl.
USPC ........................................ 358/1.13
(58) Field of Classification Search
USPC ........................................ 358/1.13
See application file for complete search history.

(56) References Cited

U.S. PATENT DOCUMENTS

2007/0139731 A1* 6/2007 Saito ............................ 358/498

FOREIGN PATENT DOCUMENTS

| JP | 2007-188043 A | 7/2007 |
| JP | 2008-15047 A | 1/2008 |
| JP | 2008-165110 A | 7/2008 |
| JP | 2010-107603 A | 5/2010 |

* cited by examiner

*Primary Examiner* — Saeid Ebrahimi Dehkordy
(74) *Attorney, Agent, or Firm* — Birch, Stewart, Kolasch & Birch, LLP

(57) ABSTRACT

Provided is an image forming apparatus capable of preventing heat in an in-body copy receiving portion from reaching a bottom face of a scanner portion disposed above the in-body copy receiving portion.

An image forming apparatus (100) includes: an in-body copy receiving portion (90); a scanner portion (123); and an air blow portion (200). The in-body copy receiving portion (90) includes a copy receiving tray (91) to stack image-formed sheets thereon, the in-body copy receiving portion being disposed in the image forming apparatus (100). The scanner portion (123) is capable of reading a document, the scanner portion being disposed above the in-body copy receiving portion (90). The air blow portion (200) generates airflow between a maximum sheet loadable position on the copy receiving tray (91) and the scanner portion (123) so as to flow along a bottom face of the scanner portion (123).

4 Claims, 7 Drawing Sheets

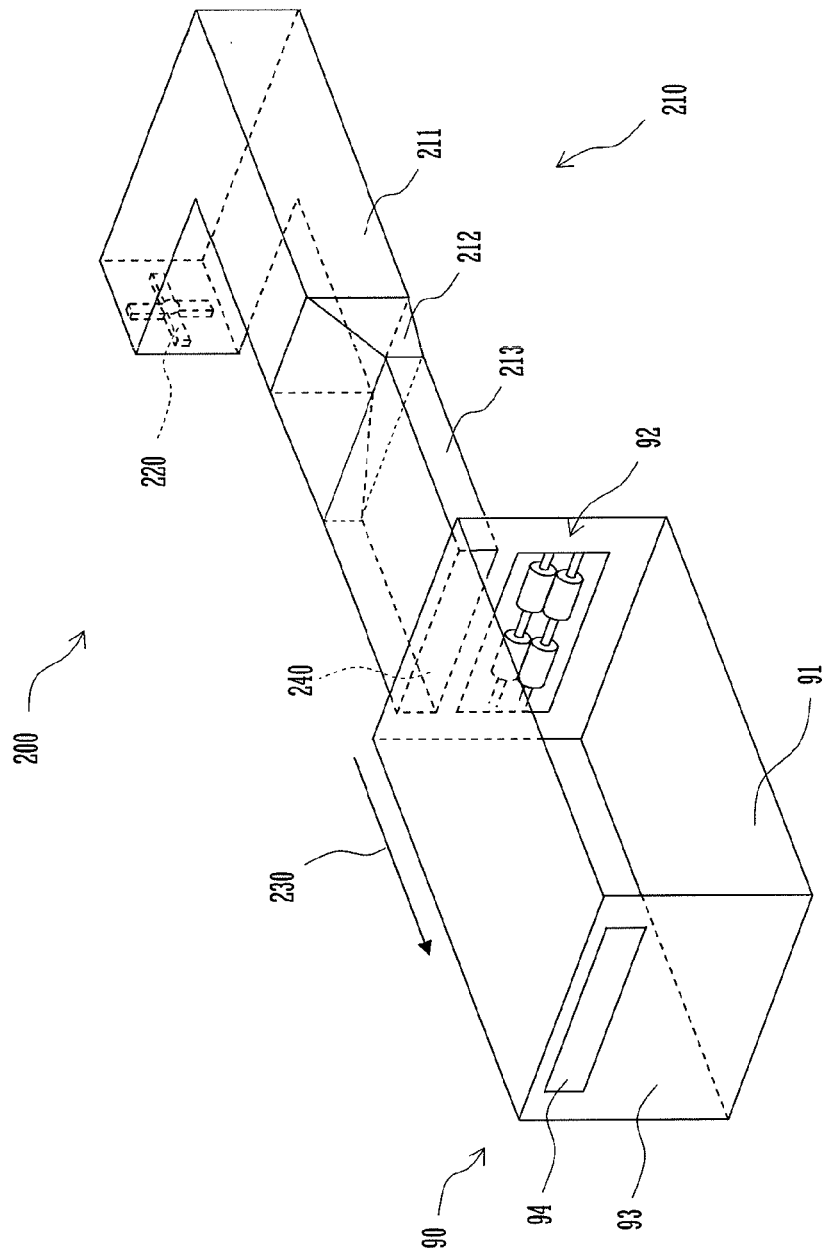

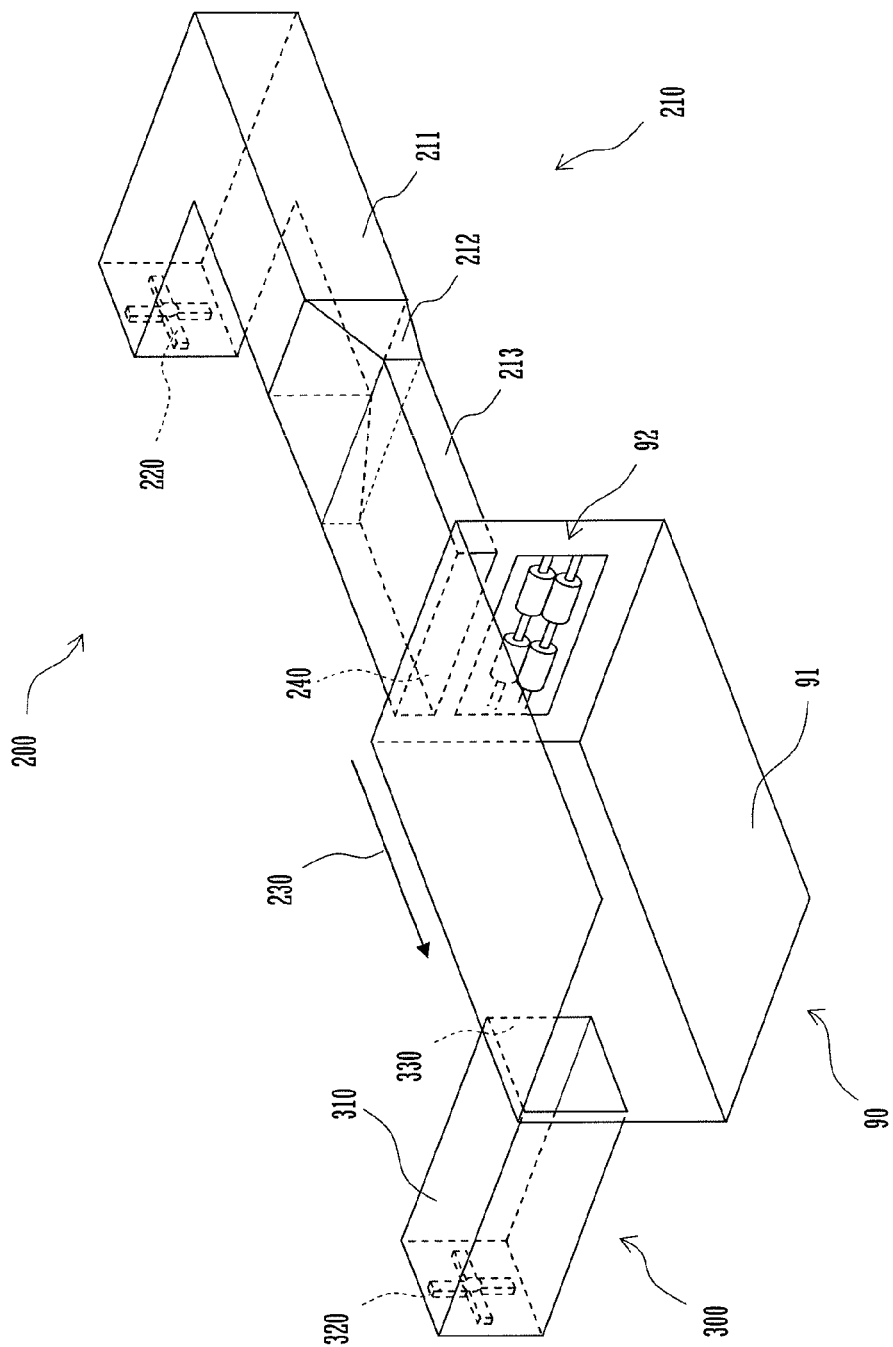

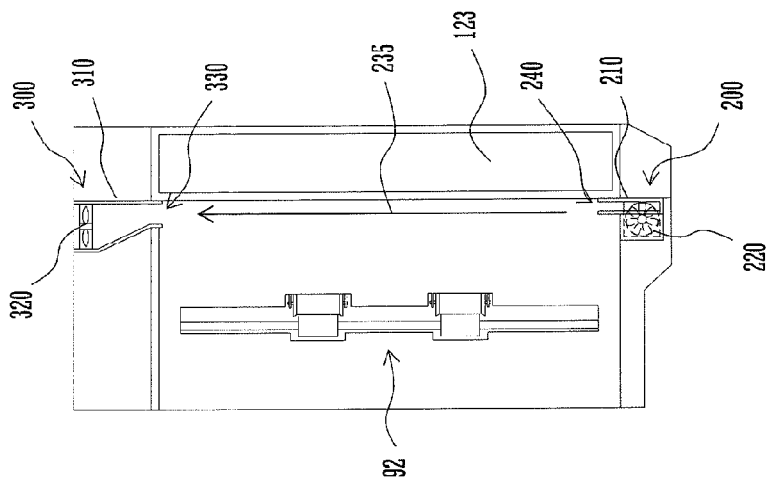
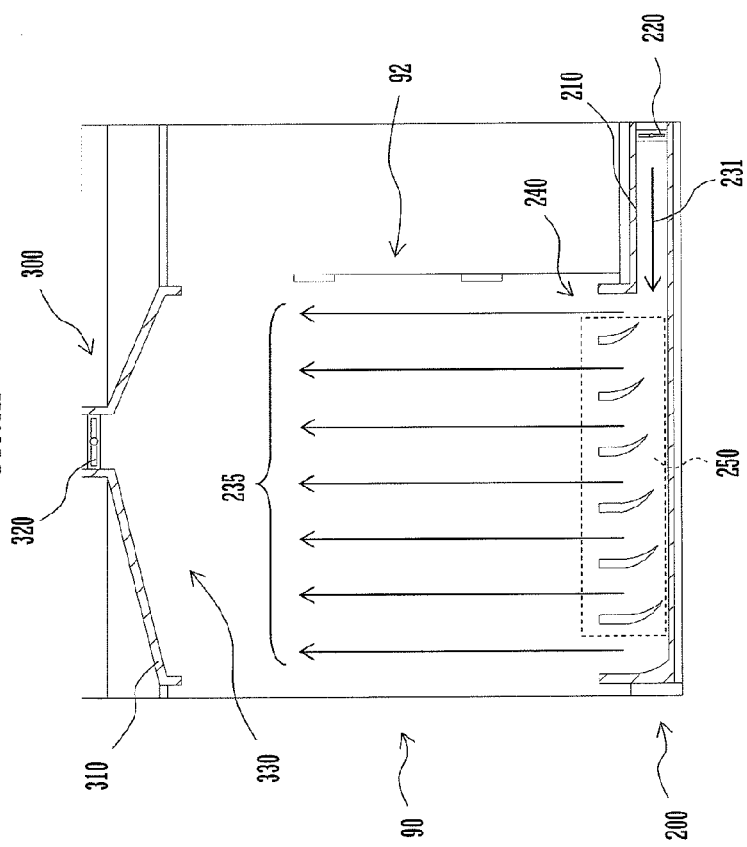
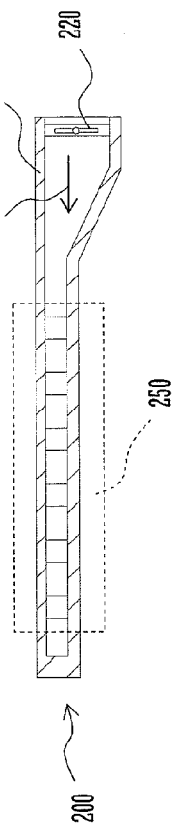

IMAGE FORMING APPARATUS

TECHNICAL FIELD

The present invention relates to image forming apparatuses that are electro-photographic image forming apparatuses configured to output sheets in their bodies.

BACKGROUND ART

Some electro-photographic image forming apparatuses include a copy receiving tray in their bodies for the purposes such as smaller footprint. In such an electro-photographic image forming apparatus, image-formed sheets passing through a fixing portion are output to an in-body copy receiving tray in a main body of the apparatus.

Since such sheets output to the in-body copy receiving tray are stacked on the tray before heat applied to the sheets at the fixing portion is dissipated sufficiently, the temperature of the air around the copy receiving tray increases. Such heated air remains in the main body of the apparatus and heats a bottom face of a scanner disposed above the copy receiving tray in the main body to increase the temperature in the scanner. Such temperature rise in the scanner adversely affects the operation of the scanner. Such a problem remarkably occurs when an inner finisher is provided in the main body of the apparatus or a plurality of paper copy receiving trays are provided in the main body.

To cope with this, disclosed is an image forming apparatus provided with an intake fan in the vicinity of an copy receiving tray in the main body thereof so as to absorb heat from the sheets stacked on the copy receiving tray and let the air out of the main body of the apparatus (see Patent Literature 1, for example).

CITATION LIST

Patent Literature

Patent Literature 1: Japanese Unexamined Patent Application Publication No. 2007-188043

SUMMARY OF INVENTION

Technical Problem

The image forming apparatus disclosed in Patent Literature 1, which includes an intake fan to simply draw the heat from sheets stacked on the copy receiving tray in the main body of the apparatus, is not sufficient to prevent the heat in the main body of the apparatus from reaching the bottom face of the scanner, and therefore fails to suppress temperature rise in the scanner.

In view of these problems, it is an object of the present invention to provide an image forming apparatus capable of preventing heat in an in-body copy receiving portion from reaching a bottom face of a scanner portion disposed above the in-body copy receiving portion.

Solution to Problem

An image forming apparatus of the present invention includes: an in-body copy receiving portion; a scanner portion; and an air blow portion. The in-body copy receiving portion includes a copy receiving tray to stack image-formed sheets thereon, the in-body copy receiving portion being disposed in a main body of the image forming apparatus. The scanner portion is capable of reading a document, the scanner portion being disposed above the in-body copy receiving portion. The air blow portion generates airflow between a maximum sheet loadable position on the copy receiving tray and the scanner portion so as to flow along an entire bottom face of the scanner portion.

The in-body copy receiving portion includes: an opening to let air in the in-body copy receiving portion from the air blow portion; and an exhaust portion to exhaust the airflow in the in-body copy receiving portion at a most downstream part of the airflow to an outside of the in-body copy receiving portion. The opening and the exhaust portion are disposed between the maximum sheet loadable position on the copy receiving tray and the bottom face of the scanner portion. The airflow is generated from the opening to the exhaust portion, whereby a heat shielding layer is formed to prevent heat in the in-body copy receiving portion from reaching the bottom face of the scanner portion.

In this configuration, since the airflow is generated between a maximum sheet loadable position on the copy receiving tray in the in-body copy receiving portion and the bottom face of the scanner portion so as to flow along the bottom face of the scanner portion. Such airflow can prevent heat in the in-body copy receiving portion from reaching the bottom face of the scanner portion disposed above the in-body copy receiving portion. Therefore, temperature rise in the scanner portion due to heat in the in-body copy receiving portion can be suppressed.

In this configuration, since the airflow path is formed above the maximum sheet loadable position on the copy receiving tray, the airflow will not affect the sheet stacking state on the copy receiving tray.

Further in this configuration, since the airflow along the bottom face of the scanner portion is generated, a sheet to be output to the copy receiving tray, even when the sheet is electrically charged, will not be adsorbed to the bottom face of the scanner portion.

Further in this configuration, since the airflow along the bottom face of the scanner portion is generated, the heat of the scanner itself also is easily dissipated.

Advantageous Effects of Invention

An image forming apparatus of the present invention is capable of preventing heat in an in-body copy receiving portion from reaching a bottom face of a scanner portion disposed above the in-body copy receiving portion.

BRIEF DESCRIPTION OF DRAWINGS

FIG. 5 is a perspective view of an air blow portion in an image forming apparatus according to Embodiment 2 of the present invention.

FIG. 6 is a perspective view of an air blow portion in an image forming apparatus according to Embodiment 3 of the present invention.

FIG. 7 illustrates an air blow portion in an image forming apparatus according to Embodiment 4 of the present invention.

DESCRIPTION OF EMBODIMENTS

The following is a detailed description of image forming apparatuses according to embodiments of the present invention, with reference to the drawings.

Firstly Embodiment 1 of the present invention is described below.

Figure 1:
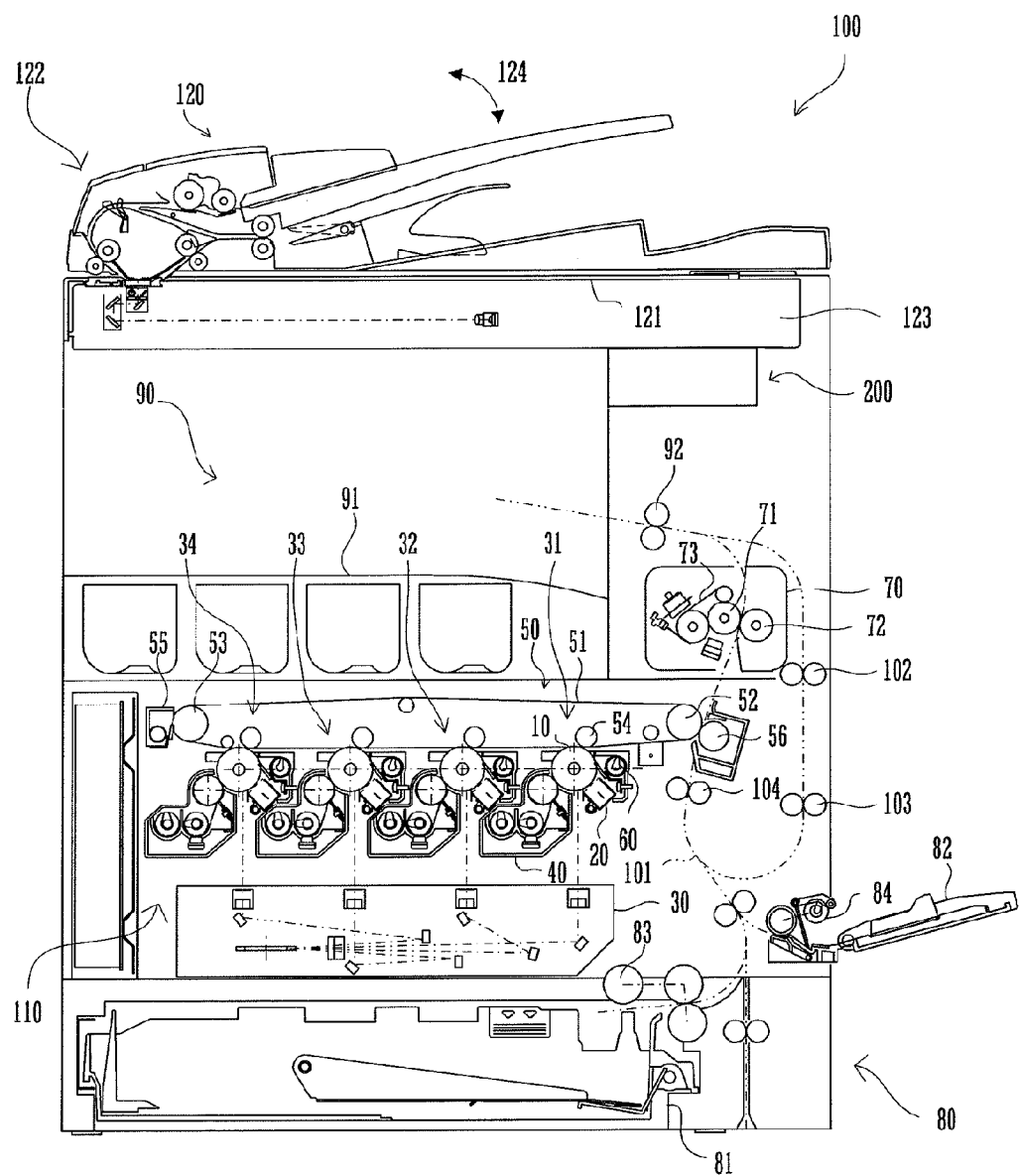
FIG. 1 illustrates a configuration of an image forming apparatus according to Embodiment 1 of the present invention.

FIG. 1 illustrates a configuration of an image forming apparatus according to one embodiment of the present invention.

An image forming apparatus 100 forms a multicolored or single-colored image on a predetermined sheet (recording sheet) in accordance with image data externally transmitted. The image forming apparatus 100 includes a document processor 120, a paper feeding portion 80, an image forming portion 110, an in-body copy receiving portion 90 and an air blow portion 200.

The document processor 120 includes a document platen 121, a document conveyor 122 and a scanner portion 123. The document platen 121 is made of transparent glass, on which a document can be placed. The document conveyor 122 conveys documents loaded on a document tray one by one. The document conveyor 122 is configured rotatably in the direction of an arrow 124 so as to leave the document platen 121 open, whereby a document can be manually placed on the document platen 121. The scanner portion 123 reads a document being conveyed along the document conveyor 122 or a document placed on the document platen 121. The scanner portion 123 is disposed above the in-body copy receiving portion 90.

The paper feeding portion 80 includes a paper feeding cassette 81, a manual paper feeding cassette 82, a pickup roller 83 and a pickup roller 84. The paper feeding cassette 81 is a tray for storing regular-sized sheets. The manual paper feeding cassette 82 is a tray for placing irregular-sized sheets. The pickup roller 83 is provided in the vicinity of an end of the paper feeding cassette 81 so as to pick up sheets one by one from the paper feeding cassette 81 and supply the sheet to a sheet conveyance path 101. Similarly, the pickup roller 84 is provided in the vicinity of an end of the manual paper feeding cassette 82 so as to pick up sheets one by one from the manual paper feeding cassette 82 and supply the sheet to the sheet conveyance path 101.

The image forming portion 110 includes image formation stations 31, 32, 33 and 34, an exposure unit 30, an intermediate transfer belt unit 50 and a fixing unit 70. The image formation stations 31, 32, 33 and 34 each include a photoreceptor drum 10, a charger 20, a development unit 40 and a cleaner unit 60, and correspond to color images in black (K), cyan (C), magenta (M) and yellow (Y), respectively. The present embodiment describes the image formation station 31.

The photoreceptor drum 10 to bear an image of a developer thereon rotates during image formation. Around the photoreceptor drum 10 are disposed the charger 20, the exposure unit 30, the development unit 40, the intermediate transfer belt unit 50 and the cleaner unit 60 in this order from the upstream of the rotation direction. The fixing unit 70 is positioned above the conveyance path 101 on the most downstream side of the image forming portion 110.

The charger 20 is charging means to uniformly charge the surface of the photoreceptor drum 10 at a predetermined electrical potential. The charger 20 may be of a charger type as illustrated in FIG. 1, or may be a roller-shaped or a brush-shaped charger of a contact type.

The exposure unit 30 functions to exposure the charged photoreceptor drum 10 with light in accordance with image data input, thereby forming an electrostatic latent image on the surface of the photoreceptor drum 10 in accordance with the image data. The exposure unit 30 is configured as a laser scanning unit (LSU) provided with a laser emitting part, a reflective mirror and the like. In the exposure unit 30 are disposed optical elements such as a polygon mirror scanning laser light and a lens and a mirror for introducing laser light reflected from the polygon mirror to the photoreceptor drum 10. Alternatively, the exposure unit 30 may include an EL or a LED writing head with an array of light-emitting elements, for example.

The development unit 40 makes the electrostatic latent image formed on the photoreceptor drum 10 visible with toner.

The intermediate transfer belt unit 50 includes an intermediate transfer belt 51, an intermediate transfer belt driving roller 52, an intermediate transfer belt idle roller 53, intermediate transfer rollers 54, and an intermediate transfer belt cleaning unit 55.

The intermediate transfer belt driving roller 52, the intermediate transfer belt idle roller 53 and the intermediate transfer rollers 54 are configured to rotary-drive the intermediate transfer belt 51 while stretching the intermediate transfer belt 51 therebetween. The intermediate transfer roller 54 gives transfer bias to transfer a toner image on the photoreceptor drum 10 to the intermediate transfer belt 51.

The intermediate transfer belt 51 is provided to come into contact with the photoreceptor drum 10, and has a function to let a toner image formed on the photoreceptor drum 10 transferred thereon and so form a toner image thereon. The intermediate transfer belt 51 is formed as an endless belt using film of 100 μm to 150 μm in thickness, for example.

The toner image is transferred from the photoreceptor drum 10 to the intermediate transfer belt 51 by means of the intermediate transfer roller 54 coming into contact with the rear side of the intermediate transfer belt 51. In order to transfer the toner image, a transfer bias of a high voltage (high voltage with reversed polarity (+) of the polarity (−) of charged toner) is applied to the intermediate transfer roller 54. The intermediate transfer roller 54 is a roller including a metal (e.g., stainless steel) shaft of 8 to 10 mm in diameter as a base that is surrounded by a conductive elastic material (e.g., EPDM or urethane foam). This conductive elastic material enables the uniform application of a high voltage to the intermediate transfer belt 51. The present embodiment uses the transfer electrodes in a roller shape, but not limited to, and brush type transfer electrodes may be used for example.

As stated above, electrostatic images made visible on the photoreceptor drums 10 are overlaid on the intermediate transfer belt 51. As the intermediate transfer belt 51 rotates, the thus overlaid image information is transferred onto a sheet by a transfer roller 56 that is disposed at a contact position of the sheet and the intermediate transfer belt 51.

At this time, the intermediate transfer belt 51 and the transfer roller 56 are brought into contact with each other under pressure with a predetermined nip, while a voltage (high voltage with reversed polarity (+) of the polarity (−) of charged toner) is applied to the transfer roller 56 for transferring of the toner onto a sheet. In order to allow the transfer roller 56 to achieve the above-stated nip steadily, any one of the transfer roller 56 and the intermediate transfer belt driving roller 52 may be made of a hard material (e.g., metal), and the other may be made of a soft material (e.g., elastic rubber roller or foaming resin roller) such as an elastic roller.

As stated above, toner adheres to the intermediate transfer belt 51 as a result of the contact with the photoreceptor drums 10 or toner remains on the intermediate transfer belt 51 without being transferred to a sheet by the transfer roller 56. In order to remove and collect such toner, the intermediate transfer belt cleaning unit 55 is provided. The intermediate transfer belt cleaning unit 55 is provided with a cleaning blade, for example, as a cleaning member coming into contact with the intermediate transfer belt 51, and at a portion of the intermediate transfer belt 51 coming into contact with the cleaning blade, the intermediate transfer belt 51 is supported by the intermediate transfer belt idle roller 53 from the opposite side.

The cleaner unit 60 removes and collects toner remaining on the surface of the photoreceptor drum 10 after development and image transferring process.

The fixing unit 70 includes a heat roller 71 and a pressure roller 72. The heat roller 71 and the pressure roller 72 rotate while sandwiching a sheet therebetween. The heat roller 71 is set at a predetermined fixing temperature by a controller not on the basis of a signal from a temperature detector not illustrated. The heat roller 71 as well as the pressure roller 72 have a function to heat and pressurize toner to a sheet to melt, mix and pressurize a toner image transferred on the sheet for heat fixing. An external heating belt 73 is provided to heat the heat roller 71 externally.

The in-body copy receiving portion 90 includes a copy receiving tray 91 and exit rollers 92. A sheet passing through the fixing unit 70 is output to the copy receiving tray 91 via the exit rollers 92. The copy receiving tray 91 is a tray for loading printed sheets.

In the case of a double-sided printing request, a sheet subjected to single-sided printing as stated above and passing through the fixing unit 70 is held at its rear end by the exit rollers 92. Thereafter, the exit rollers 92 rotate reversely and guide the sheet to conveyance rollers 102 and 103. Then, the sheet passes through paper stop rollers 104 and printing is performed on the rear face of the sheet, and the sheet is discharged to the copy receiving tray 91.

The air blow portion 200 generates an airflow between a maximum sheet loadable position on the copy receiving tray 91 and the scanner portion 123 so as to flow along the bottom face of the scanner portion 123. The following describes the configuration, the function and the advantageous effects of the air blow portion 200.

Figure 2:
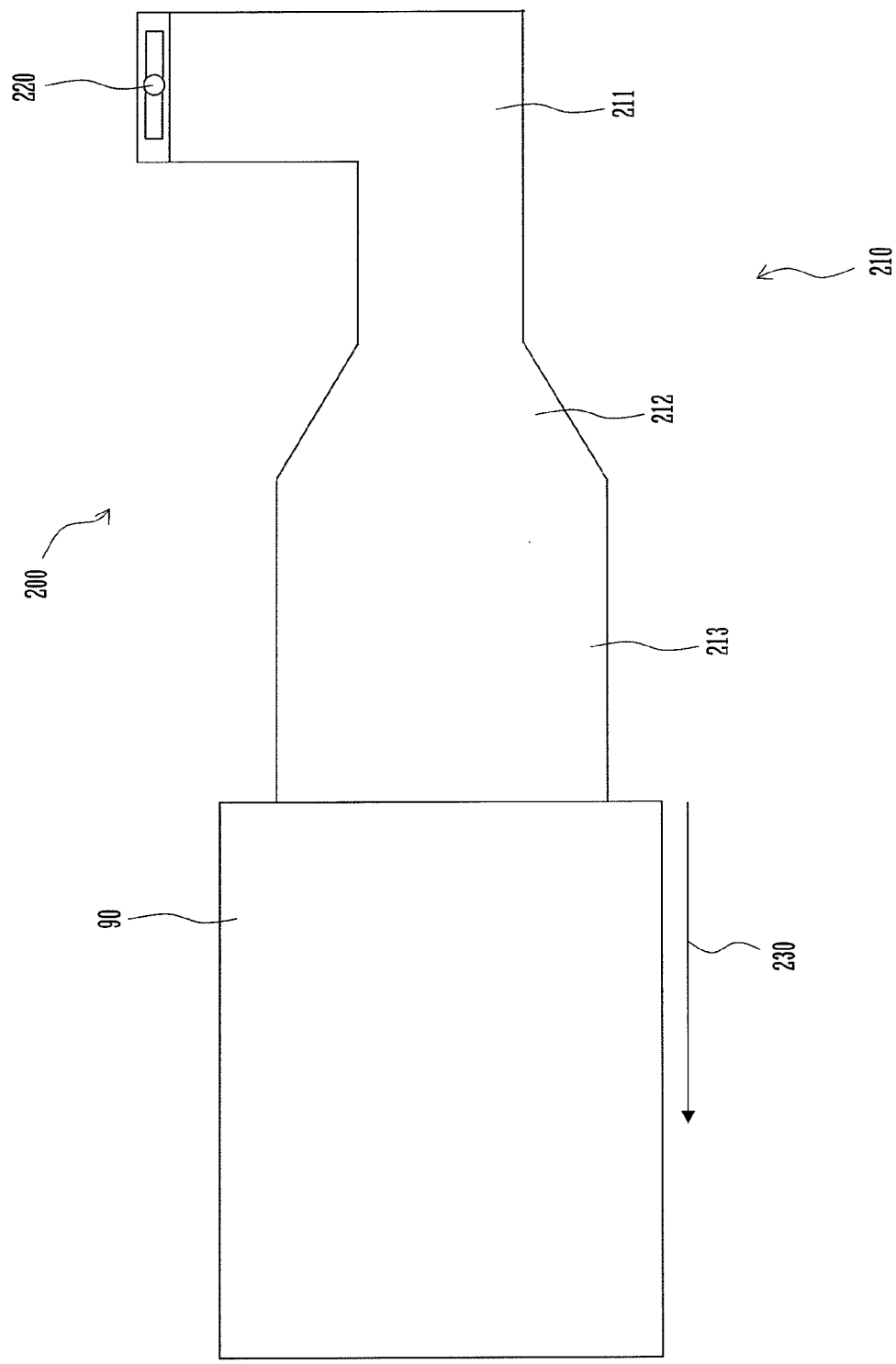
FIG. 2 illustrates an air blow portion viewed from above of the image forming apparatus according to Embodiment 1 of the present invention.
Figure 3:
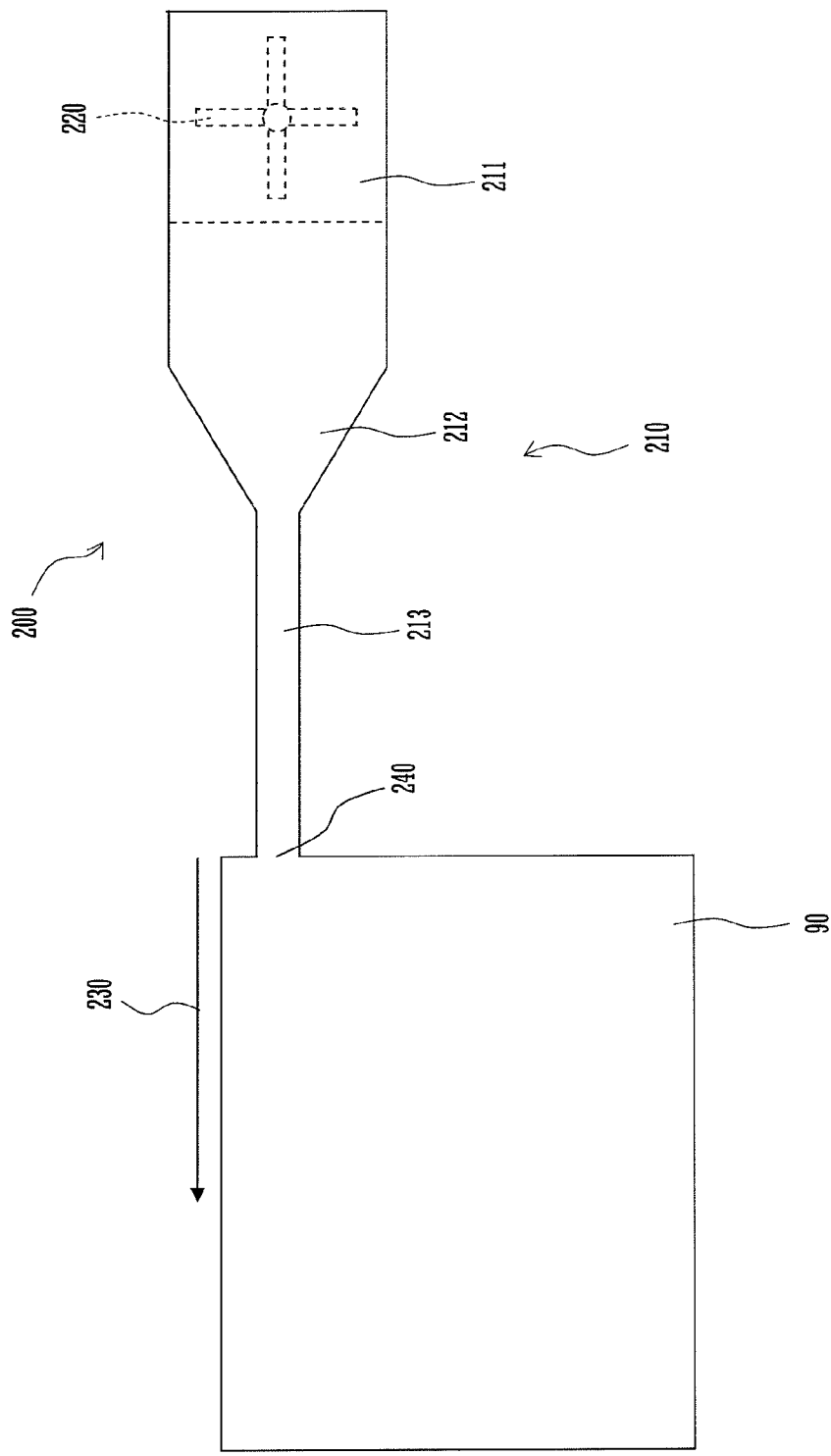
FIG. 3 illustrates the air blow portion viewed from the front face side of the image forming apparatus according to Embodiment 1 of the present invention.
Figure 4:
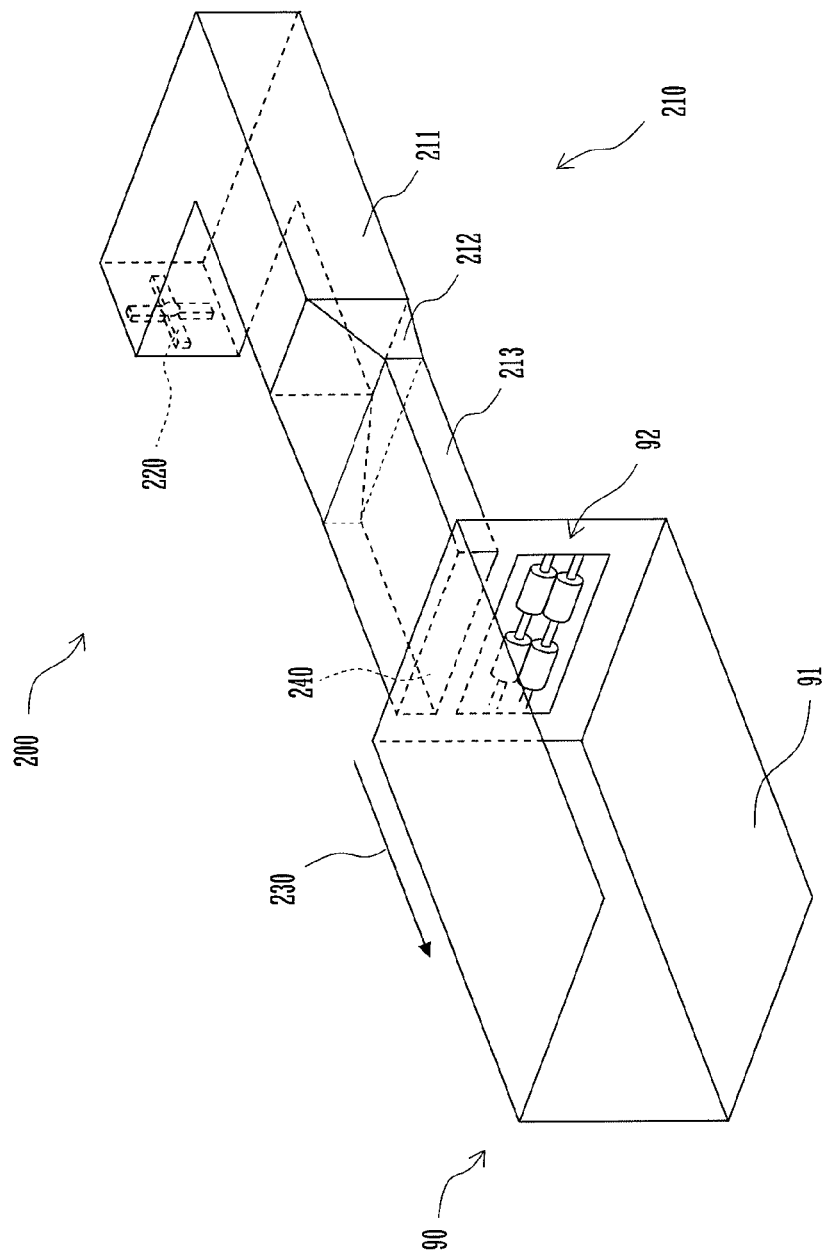
FIG. 4 is a perspective view of an air blow portion in the image forming apparatus according to Embodiment 1 of the present invention.

FIG. 2 illustrates the air blow portion 200 viewed from above of the image forming apparatus 100. FIG. 3 illustrates the air blow portion 200 viewed from the front face side of the image forming apparatus 100. FIG. 4 is a perspective view of the air blow portion 200.

The air blow portion 200 includes an air blow duct 210 and an air blow fan 220. The air blow duct 210 includes a first air blow duct 211, a second air blow duct 212 and a third air blow duct 213.

The air blow fan 220 is disposed at an open end of the first air blow duct 211. The open end of the first air blow duct 211 faces the outside of the image forming apparatus 100 on the rear face side. Accordingly, the air blow fan 220 of the air blow portion 200 in the present embodiment draws the outside air and blows the air to the air blow duct 210.

Since the air blow fan 220 is disposed at the open end of the first air blow duct 211 as stated above, the first air blow duct 211 has an internal shape matching with the size of the air blow fan 220.

The third air blow duct 213 couples with the in-body copy receiving portion 90 at one end and defines an opening 240 at the coupling portion. The air flow generated by the air blow fan 220 and emitted through the opening 240 has to flow along a path between the maximum sheet loadable position on the copy receiving tray 91 and the bottom face of the scanner portion 123, and therefore the opening 240 has to be in a shape of having a longitudinal axis in the horizontal direction. Accordingly, the third air blow duct 213 has an internal shape similar to the shape of the opening 240.

As stated above, the first air blow duct 211 and the third air blow duct 213 have different shapes. Then, the first air blow duct 211 and the third air blow duct 213 are coupled via the second air blow duct 212 in the present embodiment.

Although the first air blow duct 211 and the third air blow duct 213 in the present embodiment have different shapes, the first air blow duct 211 and the third air blow duct 213 are configured to have the same vertical cross-sectional area. Therefore the amount of airflow generated by the air blow fan 220 in the first air blow duct 211 and the amount of airflow passing through the second air blow duct 212 and in the third air blow duct 213, i.e., the amount of airflow emitted from the opening 240 are substantially the same. Therefore the amount of airflow emitted from the opening 240 can be easily controlled by controlling the number of revolutions of the air blow fan 220.

The airflow passing through the air blow duct 210 and emitted from the opening 240 forms a flow path along almost the entire bottom face of the scanner portion 123 in the direction of an arrow 230. The thus formed airflow can prevent the heat in the in-body copy receiving portion 90 from reaching the bottom face of the scanner portion 123 disposed above the in-body copy receiving portion 90. Accordingly, temperature rise in the scanner portion 123 due to the heat in the in-body copy receiving portion 90 can be suppressed.

In the present embodiment, since the airflow path is formed above the maximum sheet loadable position on the copy receiving tray 91, the airflow will not affect the sheet stacking state on the copy receiving tray 91.

Further in the present embodiment, since the airflow along the bottom face of the scanner portion 123 is generated, a sheet to be output to the copy receiving tray 91, even when the sheet is electrically charged, will not be adsorbed to the bottom face of the scanner portion 123.

Further in this configuration, since the airflow along the bottom face of the scanner portion is generated, the heat of the scanner itself also is easily dissipated.

The following describes Embodiment 2 of the present invention.

As illustrated in FIG. 5, the present embodiment is provided with a wall portion 93 at an end face of the in-body copy receiving portion 90 on the opposite side of the face including the exit rollers 92 in addition to the configuration of Embodiment 1. Then, the in-body copy receiving portion 90 of the present invention opens at only one side face, and the other three faces are surrounded by the wall part. Such a configuration can prevent a sheet output to the in-body copy receiving portion 90 from falling off from the image forming apparatus 100.

The configuration as in the present embodiment provided with the wall portion 93 most downstream of the airflow usually has the possibility of the air flow hitting the wall portion 93 and reflected therefrom and then circulating in the in-body copy receiving portion 90, and such an airflow may affect the sheet stacking state on the copy receiving tray 91.

In the present embodiment, however, the wall portion 93 is provided with an exhaust outlet 94 to let the airflow out of the in-body copy receiving portion 90 most downstream of the airflow in the in-body copy receiving portion 90. The exhaust outlet 94 corresponds to an exhaust portion of the present invention. With this configuration, the airflow does not hit the wall portion 93 and is not reflected therefrom, and the airflow efficiently is discharged to the outside of the in-body copy receiving portion 90 through the exhaust outlet 94. As a result the airflow does not circulate in the in-body copy receiving portion 90 and so does not affect the sheet stacking state on the copy receiving tray 91.

The following describes Embodiment 3 of the present invention.

As illustrated in FIG. 6, the in-body copy receiving portion 90 of the present embodiment is provided with an intake portion 300 on the rear face side of the image forming apparatus 100 in addition to the configuration of Embodiment 1. The intake portion 300 includes an intake duct 310 and an intake fan 320. The intake fan 320 is disposed at an open end portion of the intake duct 310. The open end portion of the intake duct 310 faces the outside of the image forming apparatus 100 on the rear face side. The other end of the intake duct 310 defines an inlet 330 at the in-body copy receiving portion 90.

In the present embodiment, the airflow forms a flow path in the direction of an arrow 230. Then, the intake portion 300 is disposed in the direction perpendicular to the flow path of the airflow. As the intake fan 320 of the intake portion 300 rotates, the airflow flowing in the in-body copy receiving portion 90 can be drawn into the intake duct 310 via the inlet 330. The air drawn into the intake duct 310 passes through the intake fan 320 and is discharged to the outside of the image forming apparatus 100 on the rear face side.

Therefore, the airflow flowing in the in-body copy receiving portion 90 is not discharged to the front face and the side faces of the image forming apparatus 100. Therefore, since the airflow does not hit a user who is present on the front face or the side face side of the image forming apparatus 100, the user will not feel discomfort by the airflow.

Finally, the following describes Embodiment 4 of the present invention.

FIG. 7A illustrates the in-body copy receiving portion 90 viewed from above of the image forming apparatus 100. FIG. 7B illustrates the in-body copy receiving portion 90 viewed from the left side face of FIG. 7A. FIG. 7C illustrates the air blow portion 200 viewed from the front face side of FIG. 7A.

As illustrated in FIG. 7A and FIG. 7B, the air blow portion 200 is disposed on the front face side of the image forming apparatus 100. Then, the air blow duct 210 is formed from the right side face to the left side face of the image forming apparatus 100. At an end portion of the air blow duct 210 is disposed the air blow fan 220.

As illustrated in FIG. 7A, the opening 240 of the air blow duct 210 has a shape opening to the in-body copy receiving portion 90. That is, the air blown from the air blow fan 220 flows in the direction of an arrow 231 in the air blow duct 210 until the air reaches the position opposed to the in-body copy receiving portion 90, and then the air flows from the air blow duct 210 into the in-body copy receiving portion 90.

As illustrated in FIG. 7A and FIG. 7C, in the opening 240 of the air blow duct 210 are provided a plurality of deflection fins 250 disposed at substantially regular intervals. The deflection fins 250 are configured so that their tip end portions protrude closer to the front face side of the image forming apparatus 100 with increasing proximity to the downstream side of the air blow duct 210. With this configuration, the air blown from the air blow fan 220 can be branched so as to flow along the entire bottom face of the scanner portion 123 in the direction an arrow 235. That is, the air blow portion 200 of the present embodiment can generate the airflow from the front face side to the rear face side of the image forming apparatus 100.

As illustrated in FIG. 7A and FIG. 7B, the intake portion 300 is disposed on the rear face side of the image forming apparatus 100. As illustrated in FIG. 7A, the intake duct 310 is formed so that the inlet 330 is spread across the entire top face of the in-body copy receiving portion 90. At the other end portion of the inlet 330 of the intake duct 310 is disposed the intake fan 320. With this configuration, the intake portion 300 of the present embodiment can draw the airflow generated from the front face side to the rear face side of the image forming apparatus 100, and can discharge the drawn air to the outside of the image forming apparatus 100 on the rear face side.

The intake amount of the intake fan 320 is set larger than the blowing amount of the air blow fan 220. Such setting allows the air flowing along the bottom face of the scanner portion 123 to be drawn without leakage. That is, redundant air will not circulate in the in-body copy receiving portion 90, and therefore the sheet stacking state on the copy receiving tray 91 is not affected.

Further as illustrated in FIG. 7B, the inlet 330 of the intake duct 310 is formed wider than the opening 240 of the air blow portion 200 in the vertical direction. This configuration allows all airflow to flow into the inlet 330 even when the path of the airflow emitted from the opening 240 becomes widened in the vertical direction.

According to the configuration of the present embodiment, the air will not be discharged from the front face side or the side face side where a user often operates the image forming apparatus 100, and therefore the airflow will not hit the user's face or the like even when the user leans forward to pick up a sheet from the in-body copy receiving portion 90, and so the user will not feel discomfort by the airflow.

In Embodiment 1 to Embodiment 3, the air blow portion 200 is disposed so that the airflow forms a path in the direction of the arrow 230, which is not a limiting example. As long as the airflow is generated along the bottom face of the scanner portion 123 between the maximum sheet loadable position on the copy receiving tray 91 and the bottom face of the scanner portion 123, the air blow portion 200 can be disposed at any position.

In Embodiment 2, the exhaust outlet 94 is formed at the wall portion 93 provided at an end face on the opposite side of the face including the exit rollers 92 of the in-body copy receiving portion 90, which is not a limiting example. The exhaust outlet 94 may be provided at a wall face that is provided on the downstream side of the airflow.

In Embodiment 3, the intake portion 300 is disposed in the direction perpendicular to the path of the airflow, which is not a limiting example. As long as the airflow can be drawn, the intake portion 300 may be disposed at any position.

The above described embodiments are to be considered in all respects as illustrative and not restrictive. The scope of the invention is indicated by the appended claims rather than by the foregoing description. All changes which come within the meaning and range of equivalency of the claims are intended to be embraced therein.

REFERENCE SIGNS LIST 90 in-body copy receiving portion
91 copy receiving tray
94 exhaust outlet
100 image forming apparatus

123 scanner portion
200 air blow portion
300 intake portion

The invention claimed is:

1. An image forming apparatus, comprising:
an in-body copy receiving portion including a copy receiving tray to stack image-formed sheets thereon, the in-body copy receiving portion being disposed in a main body of the image forming apparatus;
a scanner portion capable of reading a document, the scanner portion being disposed above the in-body copy receiving portion; and
an air blow portion that generates an airflow between a maximum sheet loadable position on the copy receiving tray and the scanner portion so as to flow along an entire bottom face of the scanner portion,
wherein the in-body copy receiving portion includes:
an opening to let air in the in-body copy receiving portion from the air blow portion; and
an exhaust portion to exhaust the airflow in the in-body copy receiving portion at a most downstream part of the airflow to an outside of the in-body copy receiving portion, the opening and the exhaust portion are disposed between the maximum sheet loadable position on the copy receiving tray and the bottom face of the scanner portion, and opposed to each other through the bottom face of the scanner portion; and
the airflow is generated from the opening to the exhaust portion and flows along the entire bottom face of the scanner portion, whereby a heat shielding layer is formed to prevent heat in the in-body copy receiving portion from reaching the bottom face of the scanner portion.

2. The image forming apparatus according to claim 1, further comprising an intake portion that draws the airflow at a most downstream part in the in-body copy receiving portion and exhausts the drawn airflow to an outside of the main body of the image forming apparatus on a rear face side.

3. The image forming apparatus according to claim 2, wherein
the air blow portion is disposed on a front face side of the main body of the image forming apparatus to generate the airflow from the front face side to the rear face side of the main body of the image forming apparatus, and
the intake portion is disposed on the rear face side of the main body of the image forming apparatus to draw the airflow generated from the front face side to the rear face side of the main body of the image forming apparatus and exhaust the drawn air to the outside of the main body of the image forming apparatus on the rear face side.

4. The image forming apparatus according to claim 2, wherein
the air blow portion is disposed on a side face side of the main body of the image forming apparatus to generate the airflow from the side face side to another side face side of the main body of the image forming apparatus,
the airflow is deflected from a front face side to the rear face side of the main body of the image forming apparatus by a plurality of deflecting portions that deflect direction of the airflow, and
the intake portion is disposed on the rear face side of the main body of the image forming apparatus to draw the airflow generated from the front face side to the rear face side of the main body of the image forming apparatus and exhaust the drawn air to the outside of the main body of the image forming apparatus on the rear face side.

* * * * *